United States Patent
Suzuki et al.

(10) Patent No.: US 9,869,289 B2
(45) Date of Patent: Jan. 16, 2018

(54) IGNITION TIMING CONTROL DEVICE AND IGNITION TIMING CONTROL SYSTEM

(71) Applicant: NGK SPARK PLUG CO., LTD., Nagoya-shi, Aichi (JP)

(72) Inventors: Isao Suzuki, Ichinomiya (JP); Koji Yamamoto, Konan (JP); Hiroshi Inagaki, Komaki (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 203 days.

(21) Appl. No.: 14/901,889

(22) PCT Filed: Aug. 1, 2014

(86) PCT No.: PCT/JP2014/004037
§ 371 (c)(1),
(2) Date: Dec. 29, 2015

(87) PCT Pub. No.: WO2015/079601
PCT Pub. Date: Jun. 4, 2015

(65) Prior Publication Data
US 2016/0369763 A1    Dec. 22, 2016

(30) Foreign Application Priority Data

Nov. 28, 2013 (JP) ................................. 2013-246102

(51) Int. Cl.
*F02P 5/152* (2006.01)
*F02P 3/04* (2006.01)
(Continued)

(52) U.S. Cl.
CPC ............ *F02P 5/152* (2013.01); *F02D 35/027* (2013.01); *F02P 3/0435* (2013.01); *F02P 13/00* (2013.01);
(Continued)

(58) Field of Classification Search
CPC ........ F02P 5/1518; F02P 5/152; F02D 35/027
See application file for complete search history.

(56) References Cited

U.S. PATENT DOCUMENTS 5,088,044 A * 2/1992 Matsuura .............. G01L 23/225
123/406.35
5,125,382 A   6/1992 Kanno et al.
(Continued)

FOREIGN PATENT DOCUMENTS

CN    101360903 A    2/2009
DE    40 08 170 A1   9/1991
(Continued)

OTHER PUBLICATIONS

Communication dated May 19, 2017, from the European Patent Office in counterpart European application No. 14866331.3.
(Continued)

*Primary Examiner* — Thomas Moulis
(74) *Attorney, Agent, or Firm* — Sughrue Mion, PLLC

(57) ABSTRACT

The present invention provides an ignition timing control device and ignition timing control system for an internal combustion engine, capable of controlling an ignition timing of the engine promptly in response to a change in engine operating conditions. An ignition timing adjustment unit (43) is adapted to correct the ignition timing to a proper ignition timing in a retard region with reference to a maximum advance value based on a knocking signal outputted from a knocking detection unit (41) and a reference ignition signal (A) outputted from an external electronic control unit (37). The output signal from the ignition timing adjustment unit (43) can be thus promptly adjusted by retarding the ignition timing relative to a reference ignition timing given from the external electronic control unit (37) upon detection of engine knocking.

9 Claims, 11 Drawing Sheets

(51) Int. Cl.
  *F02D 35/02* (2006.01)
  *G01L 23/22* (2006.01)
  *F02P 13/00* (2006.01)
  *F02D 41/26* (2006.01)
  *F02D 41/14* (2006.01)

(52) U.S. Cl.
  CPC .......... *G01L 23/222* (2013.01); *G01L 23/225* (2013.01); *F02D 41/266* (2013.01); *F02D 2041/1431* (2013.01); *Y02T 10/46* (2013.01)

(56) References Cited

U.S. PATENT DOCUMENTS

| | | | |
|---|---|---|---|
| 5,243,942 A | | 9/1993 | Entenmann et al. |
| 5,287,281 A | | 2/1994 | Meaney |
| 5,327,868 A | * | 7/1994 | Witkowski ............ F02P 5/1521 |
| | | | 123/406.33 |
| 6,283,093 B1 | * | 9/2001 | Lautenschuetz ........ F02P 5/152 |
| | | | 123/406.33 |
| 6,581,570 B2 | * | 6/2003 | Franke .................... F02P 5/152 |
| | | | 123/406.21 |
| 7,021,286 B2 | * | 4/2006 | Yoshino ................ F02D 35/025 |
| | | | 123/406.29 |
| 2001/0002590 A1 | | 6/2001 | Cianciara et al. |
| 2006/0200299 A1 | * | 9/2006 | Torno .................... F02D 41/266 |
| | | | 701/111 |
| 2007/0137620 A1 | * | 6/2007 | Couch .................... F02D 41/20 |
| | | | 123/490 |
| 2008/0183374 A1 | | 7/2008 | Ruiz |
| 2008/0228381 A1 | | 9/2008 | Kasashima |
| 2009/0101109 A1 | | 4/2009 | Bauer et al. |
| 2015/0027409 A1 | | 1/2015 | Inagaki |
| 2016/0290884 A1 | * | 10/2016 | Bizub .................. F02B 77/085 |
| 2016/0369763 A1 | * | 12/2016 | Suzuki ..................... F02P 5/152 |

FOREIGN PATENT DOCUMENTS

| | | |
|---|---|---|
| DE | 198 27 704 A1 | 12/1999 |
| DE | 10 2007 050618 B3 | 4/2009 |
| JP | 7-103118 A | 4/1995 |
| JP | 2008-215141 A | 9/2008 |
| JP | 2009-013939 A | 1/2009 |
| JP | 2010-281263 A | 12/2010 |
| JP | 5432398 B1 | 3/2014 |
| JP | 2014-111922 A | 6/2014 |

OTHER PUBLICATIONS

International Search Report of PCT/JP2014/004037 dated Nov. 4, 2014.

\* cited by examiner

IGNITION TIMING CONTROL DEVICE AND IGNITION TIMING CONTROL SYSTEM

CROSS REFERENCE TO RELATED APPLICATIONS

This is a National Stage of International Application No. PCT/JP2014/004037 filed Aug. 1, 2014, claiming priority based on Japanese Patent Application No. 2013-246102 filed Nov. 28, 2013, the contents of all of which are incorporated herein by reference in their entirety.

FIELD OF THE INVENTION

The present invention relates to an ignition timing control device and ignition timing control system used for an internal combustion engine (sometimes simply referred to as "engine"), such as a general purpose engine for a small craft, a small generator, a lawn mower etc., an engine for a motorcycle or an engine for a construction machine, to control an ignition timing of the engine according to a knocking state of the engine.

BACKGROUND ART

It is common practice to perform ignition timing control, i.e., mount a knocking sensor on an engine and control an ignition timing of the engine based on an output of the knocking sensor for suppression of engine knocking by proper control of engine operations (see Patent Document 1).

More specifically, an ignition signal indicative of the ignition timing is outputted from an electronic control unit to an ignitor. Based on this ignition signal, a control signal is outputted from the ignitor to an ignition coil so as to cause a spark plug to generate a spark discharge.

In the ignition timing control, a maximum advance value of the ignition timing allowable for the engine is set; and a reference ignition timing (reference ignition signal timing) is set, as a reference of the ignition timing, by a predetermined margin on a retard side with respect to the maximum advance value as shown in FIG. 12A.

When the occurrence of engine knocking is not detected by the knocking sensor, the ignition timing (ignition control signal timing) is advanced stepwisely. The ignition timing is retarded when the occurrence of engine knocking is detected by the knocking sensor. The occurrence of engine knocking is prevented by the adoption of such ignition timing control.

PRIOR ART DOCUMENTS

Patent Documents

Patent Document 1: Japanese Laid-Open Patent Publication No. 2008-215141

SUMMARY OF THE INVENTION

Problems to be Solved by the Invention

For the purpose of improvement of device versatility, it has recently been proposed to arrange not only an electronic control unit for control of the engine (referred to as "internal combustion engine control unit") but also another electronic control unit (as an ignition timing adjustment unit) between the internal combustion engine control unit and the ignitor such that, while the internal combustion engine control unit outputs a reference ignition signal indicative of the reference ignition timing to the ignition timing adjustment unit, the ignition timing adjustment unit adjusts the ignition timing based on the output of the knocking sensor.

However, the combined use of the internal combustion engine control unit and the ignition timing adjustment unit can face the following problem.

In the case of inputting the reference ignition signal indicative of the reference ignition timing from the internal combustion engine control unit to the ignition timing adjustment unit (ignition timing signal input), adjusting (correcting) the reference ignition timing by the ignition timing adjustment unit depending on the occurrence or non-occurrence of engine knocking, and then, outputting the ignition signal indicative of the corrected ignition timing (referred to as "corrected ignition signal") to the ignitor (ignition timing signal output) as shown in FIG. 12(b), there is a need to carry out processing operations for correction of the inputted ignition signal.

It is thus generally conceivable to, for the above ignition timing signal output, utilize the reference ignition timing set based on the operating conditions of the engine during the immediately preceding operation cycle (i.e. the previous reference ignition timing) for determination of the current reference ignition timing and, at the same time, correct the previous reference ignition timing to e.g. an advance side.

For example, when the end timing of the time interval B between the inputs of the ignition timing signal (to the ignition timing signal adjustment unit) is advanced, the end timing of the time interval B between the outputs of the ignition timing signal (from the ignition timing adjustment unit) is advanced with one cycle delay.

This however means that, in the occurrence of a sudden change in engine speed, such a change is taken into account in the reference ignition timing with one cycle delay. In other words, the change in engine operating conditions cannot be promptly reflected in the output (corrected ignition signal) from the ignition timing adjustment unit to the ignitor. As a result, there may arise an adverse influence on engine performance such as drivability and ignition performance.

The present invention has been made to solve the above problem. It is accordingly an object of the present invention to provide an ignition timing control device and ignition timing control system capable of controlling an ignition timing promptly in response to a change in engine operating conditions.

Means for Solving the Problems (1) A first aspect of the present invention is an ignition timing control device for an internal combustion engine, comprising: a knocking detection unit that detects a knocking state of the internal combustion engine; and an ignition timing adjustment unit that adjusts an ignition timing of the internal combustion engine based on a knocking signal outputted from the knocking detection unit and indicating the knocking state of the internal combustion engine and an external ignition signal outputted from an external electronic control unit and indicating a reference ignition timing of the internal combustion engine, wherein the ignition timing adjusted by the ignition timing adjustment unit is controlled in a retard region with respect to the reference ignition timing indicated by the external ignition signal.

In the first aspect, the ignition timing adjusted by the ignition timing adjustment unit is controlled in the retard region (including the reference ignition timing) with respect to the reference ignition timing indicated by the external ignition signal (e.g. reference ignition signal).

The signal outputted from the ignition timing adjustment unit can be thus adjusted promptly by retarding the ignition timing relative to the external input signal outputted from the external electronic control unit.

Namely, the timing of the signal (corrected ignition signal) outputted from the ignition timing adjustment unit to e.g. an ignitor can be promptly adjusted in the first embodiment. It is therefore possible to, even when there occurs a sudden change in engine operating conditions, properly adjust the ignition timing for improvement of engine performance such as drivability and ignition performance.

The reference ignition timing indicated by the external ignition signal is, for example, set to be within the range of MBT (Minimum Advance for Best Torque). In this case, the retard region with respect to the reference ignition timing is set to the range of a given value of e.g. +5° to +10° relative to MBT.

(2) A second aspect of the present invention is the ignition timing control device wherein the ignition timing adjustment unit retards the ignition timing when detecting the occurrence of knocking in the engine based on the knocking signal.

In the second aspect, the ignition timing is retarded upon detection of the engine knocking. It is thus possible to promptly adjust the signal outputted from the ignition timing adjustment unit and properly suppress the engine knocking.

(3) A third aspect of the present invention is the ignition timing control device wherein the ignition timing adjustment unit adds a predetermined retard amount to a previously set value of the ignition timing when detecting the occurrence of knocking in the engine based on the knocking signal.

In the third aspect, the predetermined retard amount is added to the previously set value of the ignition timing (e.g. previously retarded ignition timing value) upon detection of the engine knocking. The ignition timing is consequently controlled such that the degree of retard of the ignition timing is gradually increased. It is thus possible to ensure both of high engine torque and knocking suppression.

(4) A fourth aspect of the present invention is the ignition timing control device wherein the ignition timing adjustment unit retards the ignition timing by a maximum retard amount when detecting the occurrence of knocking in the engine based on the knocking signal.

In the fourth aspect, the ignition timing is retarded by the maximum retard amount in one stroke upon detection of the engine knocking. It is thus possible to promptly suppress the engine knocking.

Herein, the maximum retard amount refers to a maximum allowable amount of retard of the reference ignition timing during the ignition timing retard control and is set to e.g. a given value within the range of +5° to +10° relative to MBT.

(5) A fifth aspect of the present invention is the ignition timing control device wherein the ignition timing adjustment unit advances the ignition timing within the retard region when detecting the occurrence of no knocking in the engine based on the knocking signal.

In the fifth aspect, the ignition timing is advanced within the retard region with respect to the reference ignition timing upon detection of no engine knocking. It is thus possible to ensure high engine torque.

(6) A sixth aspect of the present invention is the ignition timing control device wherein the ignition timing adjustment unit adds a predetermined advance amount is added to a previously set value of the ignition timing when detecting the occurrence of no knocking in the engine based on the knocking signal.

In the sixth aspect, the predetermined advance amount is added to the previously set value of the ignition timing (e.g. previously advanced ignition timing value) upon detection of no engine knocking. The ignition timing is consequently controlled such that the degree of advance of the ignition timing is gradually increased. It is thus possible to increase the engine torque while suppressing the engine knocking.

(7) A seventh aspect of the present invention is the ignition timing control device wherein the ignition timing adjustment unit adjusts the ignition timing to the reference ignition timing when detecting the occurrence of no knocking in the engine based on the knocking signal.

In the seventh aspect, the ignition timing is advanced to the reference ignition timing in one stroke upon detection of no engine knocking. It is thus possible to promptly increase the engine torque.

(8) An eighth aspect of the present invention is the ignition timing control device wherein the reference ignition timing is set corresponding to a maximum advance value.

An example of the reference ignition timing is given in the eighth aspect.

The maximum advance value herein refers to e.g. an ignition timing optimal for the engine with no influence on engine performance and is set as appropriate by an engine maker in view of engine performance such as MBT and knocking limit (over which the engine may be broken by advance of the ignition timing).

(9) A ninth aspect of the present invention is an ignition timing control system, comprising the ignition timing control device according to any one of the first to eighth aspects and the external electronic control unit.

In the ninth aspect, the ignition timing control system is provided with the above-mentioned ignition timing control device. It is possible to obtain the same effects as above, e.g., possible to set the suitable ignition timing in response to the change in engine operating conditions (as in the case of any one of the first to eighth aspects).

DESCRIPTION OF EMBODIMENTS

Hereinafter, ignition timing control device and ignition timing control system according to exemplary embodiments (examples) of the present invention will be described below.

First Embodiment

An ignition timing control system with an ignition timing control device according to the present first embodiment is designed for use in various engines (internal combustion engines) so as to prevent the occurrence of knocking in an internal combustion engine by ignition timing control. In the following explanation, a four-cycle engine for a motorcycle is taken as an example of the internal combustion engine.

a) First, the system configuration of the internal combustion engine with the ignition timing control device of the present first embodiment will be explained below.

Figure 1:
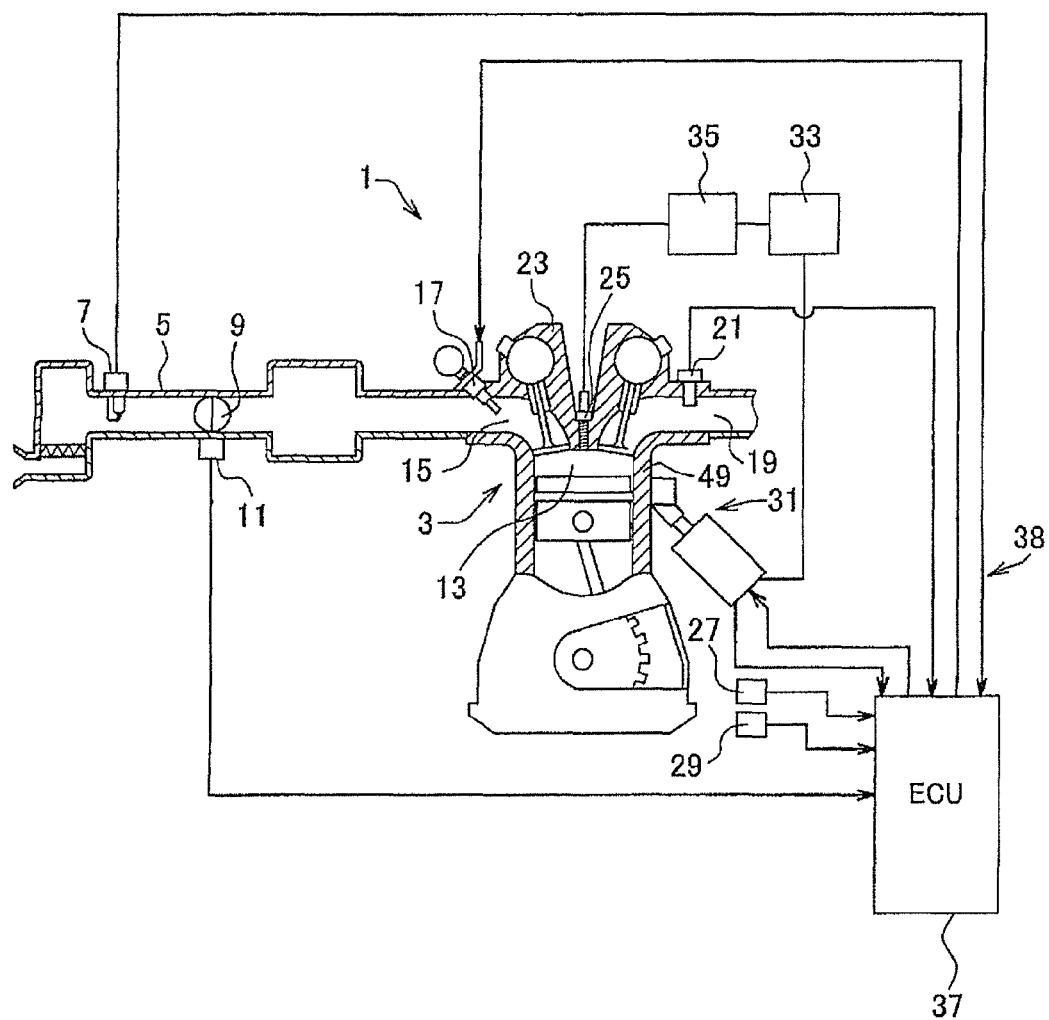
FIG. 1 is a system diagram of an internal combustion engine with an ignition timing control device according to a first embodiment of the present invention.

As shown in FIG. 1, the internal combustion engine (engine) 1 has an engine body 3, an intake pipe 5 for introducing air to the engine body 3, an air flow meter 7 for detecting an amount of the intake air, a throttle valve 9 for adjusting the amount of the intake air, a throttle opening sensor 11 for detecting an opening of the throttle valve 9, an intake manifold 15 for introducing the intake air into a combustion chamber 13, a fuel injection valve 17 of injecting fuel into the intake manifold 15, an exhaust manifold 19 for exhausting the air (combustion gas) from the engine body 3 and an air-fuel ratio sensor (or oxygen sensor) 21 for detecting an air-fuel ratio of the exhaust gas from the exhaust manifold 19.

A spark plug 25 is fixed to a cylinder head 23 of the engine body 3. There is mounted, on the engine body 3, an engine speed sensor 27 for detecting a speed (rotation speed) of the engine and a crank angle sensor 29 for detecting a crank angle of the engine.

The after-mentioned ignition timing control device 31 is mounted to the engine body 3. An ignitor 33 is coupled to the ignition timing control device 31. An ignition coil 35 is coupled to the ignitor 33. The spark plug 25 is coupled to the ignition coil 35.

An internal combustion engine control unit (sometimes simply referred to as "engine control unit") 37 is provided to perform integral control of the engine 1 according to operating conditions of the engine body 3 (such as air-fuel ratio feedback control based on the engine speed and the output of the air-fuel ratio sensor 21). Although not shown in the drawings, the internal combustion engine control unit 37 is in the form of a known electronic control unit (ECU) having a microcomputer equipped with a RAM, a ROM, a CPU etc.

In the present invention, the internal combustion engine control unit 37 serves to an external electronic control unit. Further, the ignition timing control device 31 and the internal combustion engine control unit 37 serve together as the ignition timing control system 38.

The air flow meter 7, the throttle opening sensor 11, the air-fuel ratio sensor 21, the engine speed sensor 27, the crank angle sensor 29 and the ignition timing control device 31 are connected to input ports (not shown) of the internal combustion engine control unit 37 such that the output signals (e.g. sensor signals) of these devices are inputted to the engine control unit through the input ports.

On the other hand, the fuel injection valve 17 and the ignition timing control device 31 are connected to output ports (not shown) of the internal combustion engine control unit 37 such that the internal combustion engine control unit 37 outputs control signals to control the operations of these devices.

b) Next, the structural configuration of the ignition timing control device 31 of the present first embodiment will be explained below in detail.

Figure 2A:
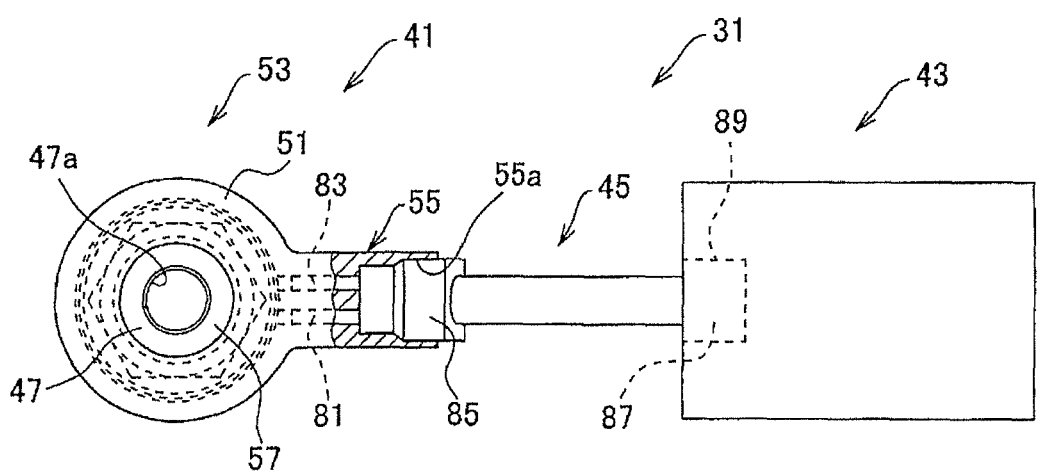
FIG. 2A is a plan view, partially in section, of the ignition timing control device according to the first embodiment of the present invention.

In the present first embodiment, the ignition timing control device 31 has a knocking detection unit 41 and an ignition timing adjustment unit 43 electrically and mechanically disconnectably coupled together through a connection cable 45 as shown in FIG. 2.

The knocking detection unit 41 is configured as a known non-resonant knocking sensor, which has a piezoelectric element 65 on a metal shell 47, and is fixed to a cylinder block 49 of the engine body 3 by insertion of a fixing bolt (not shown) into an axial hole 47a of the metal shell 47 (also see FIG. 1).

Almost the whole of the knocking detection unit 41 is molded with a resin molded body 51. This knocking detection unit 41 includes a substantially cylindrical body part 53 and a substantially rectangular connector part 55 protruding from a lateral surface of the body part 53.

Figure 2B:
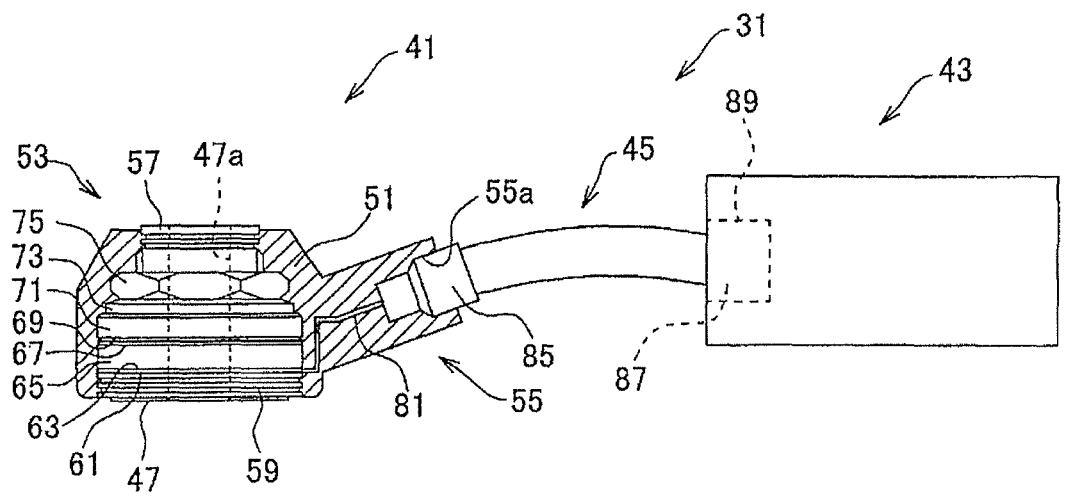
FIG. 2B is a front view, partially in section, of the ignition timing control device according to the first embodiment of the present invention.

The metal shell 47 is provided in the body part 53 and has a circular cylindrical portion 57 and an annular collar portion 59 at one end (lower end in FIG. 2(b)) of the cylindrical portion 57. An annular first insulating plate 61, an annular first electrode plate 63, the annular piezoelectric element 65, an annular second electrode plate 67, an annular second insulating plate 69, an annular weight 71, an annular disc spring 73 and an annular nut 75 are arranged around the cylindrical portion 57 in this order from the side of the collar portion 59. First and second output terminals 81 and 83 are connected to the first and second electrode plates 63 and 67, respectively, so as to take out a signal generated between the electrode plates 63 and 67.

The ignition timing adjustment unit 43 is configured to adjust the ignition timing of the engine and is in the form of a known electronic control unit having a microcomputer equipped with a RAM, a ROM, a CPU etc. as in the case of the internal combustion engine control unit 37

The connection cable 45 contains therein electric wires (not shown) connected to the first and second output terminals 81 and 83. First and second connectors 85 and 87 are provided on both ends of the connection cable 45 and connected to the respective electric wires.

The first connector 85 is fitted in an opening 55*a* of the connector part 55 of the knocking detection unit 41 for connection of the electric wires to the first and second output terminals 81 and 83. The second connector 87 is fitted in a recessed connector part 89 of the ignition timing adjustment unit 43 for connection of the electric wires to internal wires (not shown) of the ignition timing adjustment unit 43.

In the present first embodiment, the first connector 85 of the connection cable 45 is fitted in and disconnectably fixed by an adhesive to the connector part 55 of the knocking detection unit 41. Similarly, the second connector 87 of the connection cable 45 is fitted in and disconnectably fixed by an adhesive to the connector part 89 of the ignition timing adjustment unit 43.

c) The electrical configuration of the ignition timing control device 31 will be next explained below in detail.

Figure 3A:
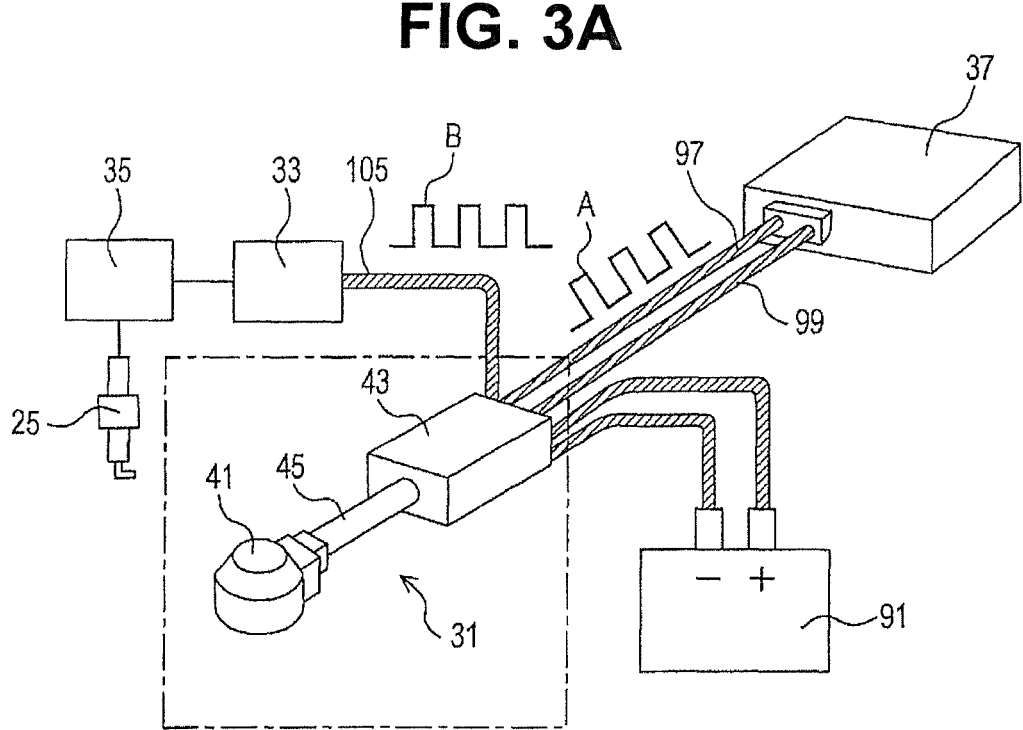
FIG. 3A is a schematic view showing the ignition timing control device and its peripheral devices according to the first embodiment of the present invention.
Figure 3B:
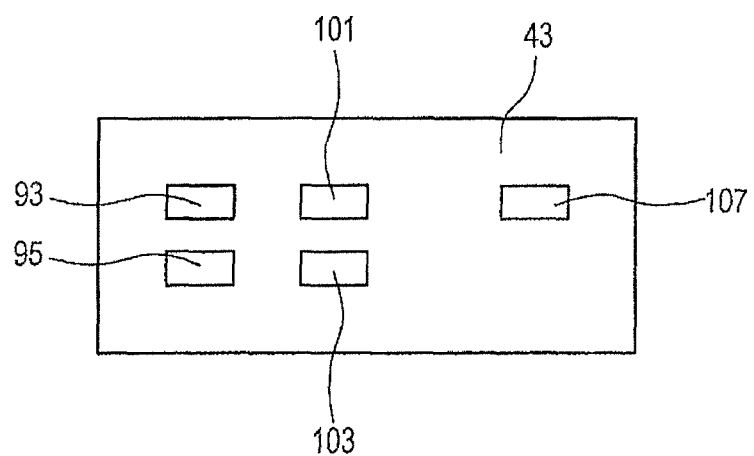
FIG. 3B is a schematic view showing connection terminals of an ignition timing adjustment unit of the ignition timing control device according to the first embodiment of the present invention.

As shown in FIG. 3, the ignition timing adjustment unit 43 of the ignition timing control device 31 is operated by power supply from a battery 91. The ignition timing adjustment unit 43 is thus provided with a pair of power terminals 93 so as to receive power from the battery 91.

Further, the ignition timing adjustment unit 43 is detachably coupled to the internal combustion engine control unit 37 through a pair of lead lines (signal lines) 97 and 99. These lead lines 97 and 99 are detachable from both of the ignition timing adjustment unit 43 and the internal combustion engine control unit 37.

The ignition timing adjustment unit 43 has a signal receiving terminal 101 for receiving the after-mentioned ignition signal (i.e. reference ignition signal: A) from the internal combustion engine control unit 37 and a signal output terminal 103 for outputting, from the ignition timing adjustment unit 43 to the internal combustion engine control unit 37, a signal indicating the occurrence of a failure (anomaly) in the knocking detection unit 41 or the ignition timing adjustment unit 43 although details of such failure signal output are omitted.

The ignition timing adjustment unit 43 is also coupled to the ignitor 33 through a single lead line 105 and has an ignition terminal 107 for outputting the after-mentioned ignition signal (as adjusted) (i.e. corrected ignition signal: B) to the ignitor 33 so as to actuate the ignition coil 35.

Figure 4:
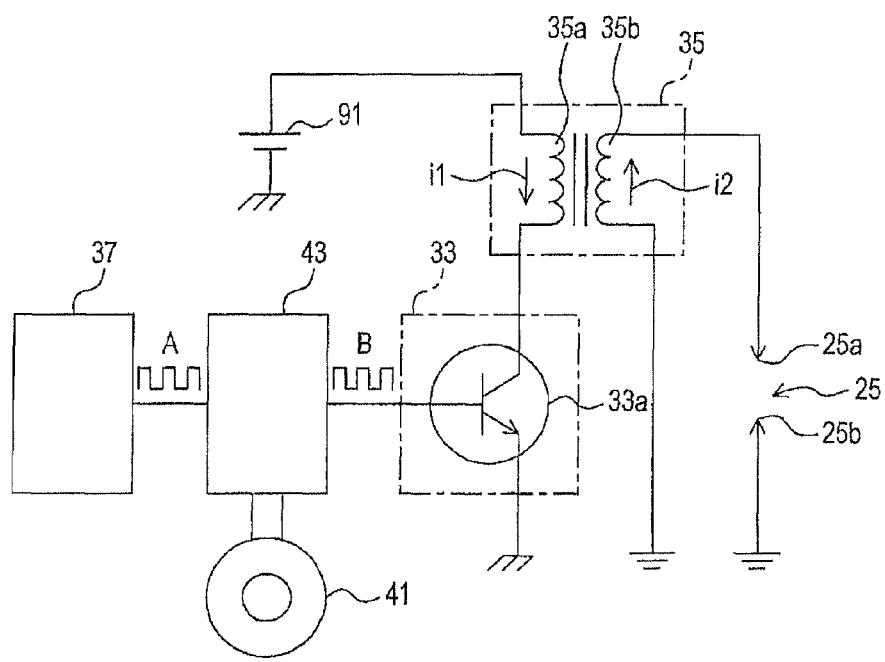
FIG. 4 is an electrical block diagram of the ignition timing control device and its peripheral devices according to the first embodiment of the present invention.

As shown in FIG. 4, the ignition coil 35 has primary and secondary windings 35*a* and 35*b*. One end of the primary winding 35*a* is connected to a positive terminal of the battery 91, whereas the other end of the primary winding 35*a* is connected to a collector of an n-p-n type power transistor 33*a* (of the ignitor 33). The power transistor 33*a* is a switching element for switching between energization and non-energization of the primary winding 35*a*. An emitter of the power transistor 33*a* is grounded to the same potential as a negative terminal of the battery 91.

One end of the secondary winding 35*b* is grounded to the same potential as the negative terminal of the battery 91, whereas the other end of the secondary winding 35*b* is connected to a center electrode 25*a* of the spark plug 25. A ground electrode 25*b* of the spark plug 25 is also grounded to the same potential as the negative terminal of the battery 91.

In the present first embodiment, the internal combustion engine control unit 37 and the ignition timing adjustment unit 43 are coupled to each other such that, when the connected ignition signal (B) is outputted from the ignition timing adjustment unit 43 to a base of the power transistor 33*a*, the power transistor 33*a* performs switching operation based on the corrected ignition signal (B) so as to allow switching between energization and non-energization of the primary winding 35*a* of the ignition coil 35.

d) Next, the ignition timing control operations of the ignition timing control device 31 will be explained below.

The internal combustion engine control unit 37 determines a reference ignition timing as a reference of the ignition timing based on the engine speed, the intake air amount and the like.

In particular, the reference ignition timing (reference ignition signal timing) is set corresponding to a maximum advance value, which refers to an ignition timing for e.g. maximum engine torque, and is not set to an ignition timing retarded by a sufficient margin relative to the maximum advance value as in conventional technique The maximum advance value is, for example, set to an ignition timing optimal for the engine 1 with no influence on engine performance.

The internal combustion engine control unit 37 outputs a signal indicative of the reference ignition timing as the reference ignition signal (A: see the upper side of FIG. 6) to the ignition timing adjustment unit 43.

The ignition timing adjustment unit 43, while receiving the reference ignition signal (A), detects a signal (knocking signal) from the knocking detection unit 41 and judges the occurrence or non-occurrence of knocking in the engine based on the knocking signal. For example, the occurrence or non-occurrence of engine knocking can be judged based on the intensity of the peak of the knocking signal.

Figure 6:
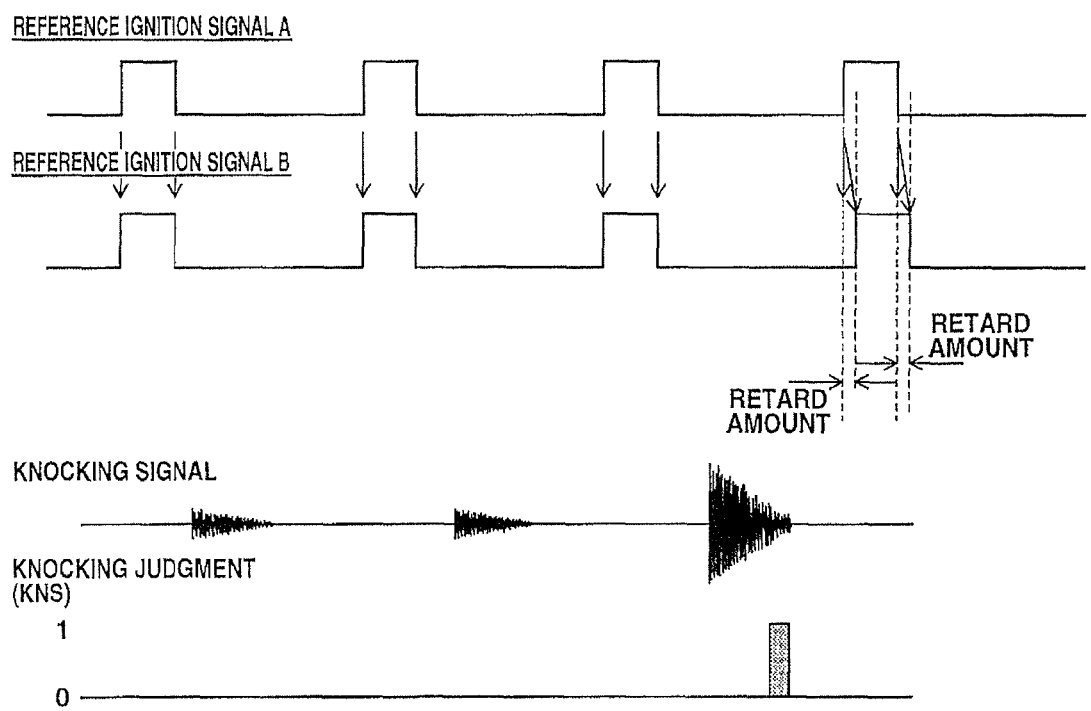
FIG. 6 is a timing chart showing the relationship of a reference ignition timing A and a corrected ignition timing B set by the ignition timing control device according to the first embodiment of the present invention.

Then, the ignition timing adjustment unit 43 adjusts (corrects) the ignition timing according to the state of occurrence of engine knocking, determines a corrected ignition timing and outputs a signal indicative of the corrected ignition timing as the corrected ignition signal (B: see the lower side of FIG. 6).

Figure 5:
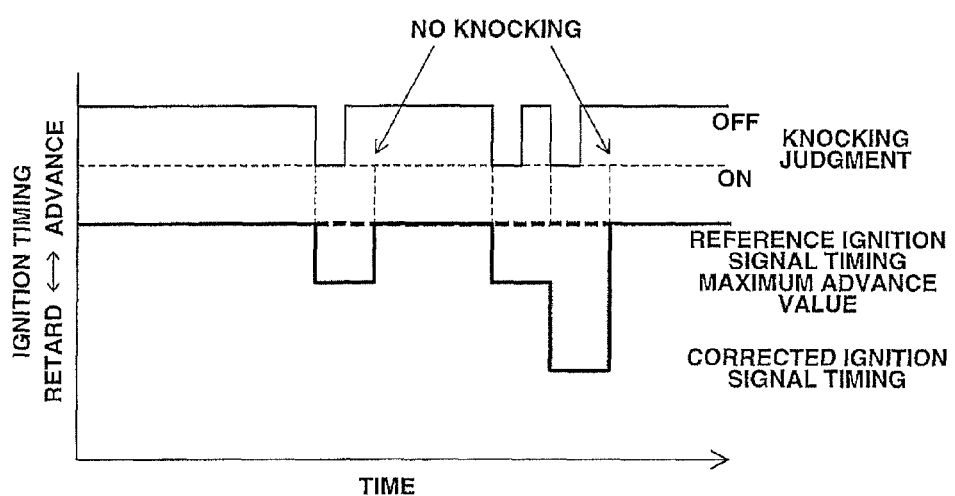
FIG. 5 is a graph showing the relationship of engine knocking and ignition timing control performed by the ignition timing control device according to the first embodiment of the present invention.

More specifically, a judgement is made on the occurrence or non-occurrence of engine knocking at every predetermined time interval (every combustion cycle) as shown in FIG. 5. Upon judging that engine knocking is occurring, the ignition timing is retarded by a predetermined retard amount (e.g. +1°) at every predetermined time interval until the ignition timing reaches a maximum retard value (e.g. +5° relative to the maximum advance value). The corrected ignition signal (B) is set to indicate such a corrected ignition timing.

As shown in FIG. 6, the knocking signal is detected during a time period from the output (ON-to-OFF switching) of the current reference ignition signal (A) to the input (OFF-to-ON switching) of the next (immediately subsequent) reference ignition signal (A) (by setting the after-mentioned knock detection window KNW). The occurrence or non-occurrence of engine knocking is judged based on the detected knocking signal. The judgment result is used for correction of the next reference ignition signal (A).

In the occurrence of engine knocking, i.e., when the after-mentioned knock detection flag is set to 1, the corrected ignition signal (B) (for the next combustion cycle) is set by retarding the reference ignition signal (A) (for the next combustion cycle) by a predetermined retard amount as shown in the right side of FIG. 6.

Namely, the corrected ignition signal (B) is set to indicate an ignition timing retarded by a predetermined retard amount relative to the reference ignition signal (A) for the same next combustion cycle.

In the non-occurrence of engine knocking, by contrast, the corrected ignition timing is set by e.g. advancing the ignition timing back to the reference ignition timing (maximum advance value) in one stroke.

As mentioned above, the adjustment of the ignition timing is always made in a retard region (including the maximum advance value) with respect to the maximum advance value in the present first embodiment. The corrected ignition timing is never advanced relative to the reference ignition timing.

The ignition timing adjustment unit may be configured not to perform the above ignition timing correction in a transient state where a change in engine speed is larger than a given value during engine start, acceleration etc. (e.g. in the case where it is difficult to properly control the ignition timing by the above reference ignition timing setting).

When the corrected ignition timing is determined as mentioned above, the corrected ignition signal (B) is outputted from the ignition timing adjustment unit 43 to the ignitor 33 as shown in FIG. 4. Upon input of the corrected ignition signal (B) to the base of the power transistor 33a, the power transistor 33a performs switching operation according to the ON/OFF state of the corrected ignition signal (B).

When the corrected ignition signal (B) is in an OFF state (low level; in general, ground potential), there is no current flow through the base of the power transistor 33a so that the power transistor 33a is switched off (i.e. switched to a de-energization state) to interrupt an electric current (primary current i1) to the primary winding 35a. When the corrected ignition signal (B) is in an ON state (high level; positive voltage supply from the ignition timing adjustment unit 43), there is a current flow through the base of the power transistor 33a so that the power transistor 33a is switched on (i.e. switched to an energization state) to permit an electric current (primary current i1) through the primary winding 35a. By such energization of the primary winding 35a, magnetic flux energy is accumulated on the ignition coil 35.

When the corrected ignition signal (B) is switched to the low level from the high level during the flow of the primary current i1 through the primary winding 35a, the power transistor 33a is switched off to interrupt (stop) the primary current i1 to the primary winding 35a. Then, the magnetic flux density of the ignition coil 35 changes suddenly to develop an ignition voltage through the secondary winding 35b. By the application of such an ignition voltage to the spark plug 25, the spark plug 25 generates a spark discharge between the center electrode 25a and the ground electrode 25b. At this time, an electric current flows as a secondary current i2 through the secondary winding 35b.

Each of the reference ignition signal (A) and the corrected ignition signal (B) includes information about the timing of switching of the ignition signal from the low level to the high level and from the high level to the low level. The timing of switching of the ignition signal from the high level to the low level corresponds to a desired ignition timing (timing of ignition). The ignition signal remains at the high level for a predetermined period so as to accumulate a required amount of magnetic flux energy.

e) The operation processes of the ignition timing adjustment unit 43 will be explained below.

<Corrected Ignition Timing Determination Process>

This process is performed to determine the corrected ignition timing based on the reference ignition timing, which corresponds to the maximum advance value, and to determine the engine speed with reference to the reference ignition signal (A).

Figure 7:
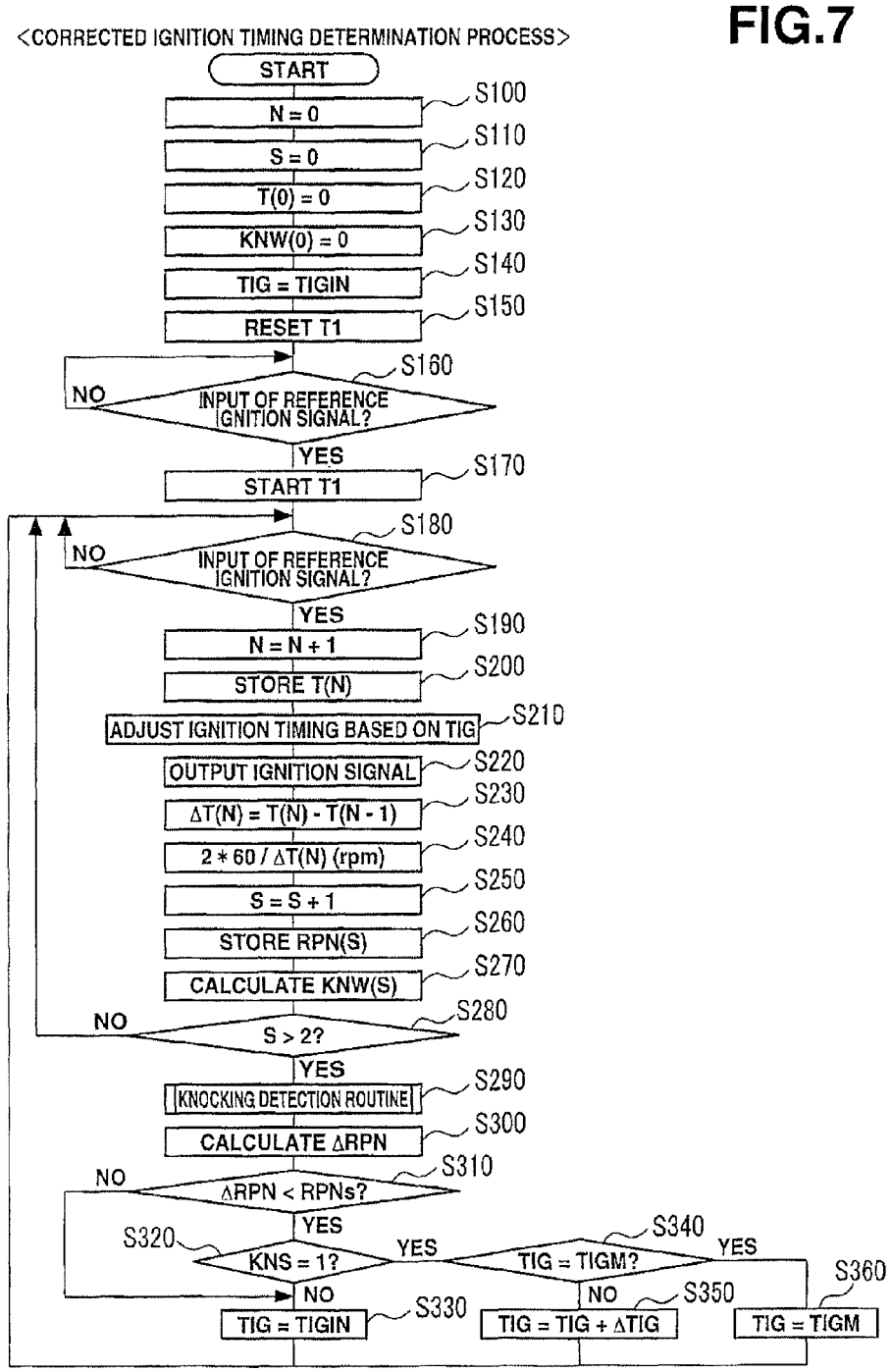
FIG. 7 is a flowchart for a corrected ignition timing determination process of the ignition timing adjustment unit according to the first embodiment of the present invention.

As shown in the flowchart of FIG. 7, the timer memory variable N is reset (set to 0) at step (S) 100.

At step 110, the stored engine speed/knock window variable S is reset. This stored engine speed/knock window variable S is a variable indicating a time series of the engine speed as sequentially stored at step 260 as well as a time series of the crank angle window for knocking detection as sequentially stored at step 270.

At step 120, the initial value T(0) of the timer T is set to 0.

At step 130, the initial value KNW(0) of the knock detection window KNW is set to 0. This knock detection window KNW is a predetermined region (rotation angle range) where there is a possibility of engine knocking and corresponds to a given period starting from the ignition timing and to an analysis region of the knocking signal.

At step 140, the reference ignition timing (input ignition timing) TIGIN is set as the corrected ignition timing TIG on the basis of the reference ignition signal (A) from the internal combustion engine control device 37. It is herein noted that the corrected ignition timing TIG set in this step is a value not yet corrected.

At step 150, the ignition signal interval measurement timer T1 is reset.

At step 160, it is judged whether or not the reference ignition signal (A) is inputted. When the judgment result is affirmative, the process goes to step 170. When the judgment result is negative, the process stands by in this step.

At step 170, the ignition signal interval measurement timer T1 is started to measure a time elapsed from the input of the reference ignition signal (A).

At step 180, it is again judged whether or not the reference ignition signal (A) is inputted. When the judgment result is affirmative, the process goes to step 190. When the judgment result is negative, the process stands by in this step.

Upon receipt of the input of the reference ignition signal (A), the timer memory variable N is counted up at step 190.

At step 200, the time at which the current input (Nth input) of the reference ignition signal (A) is received is stored as a timer count T(N). Namely, the count value of the ignition signal interval measurement timer T1 is stored as the timer count T(N).

At step 210, the ignition timing is adjusted on the basis of the corrected ignition timing TIG. Herein, the corrected ignition timing TIG set through the after-mentioned steps 330, 350 and 360 is determined as the actual ignition timing.

At step 220, the ignition signal (corrected ignition signal (B)) is outputted to the ignitor 33 at the ignition timing set at step 210 for ignition operation (spark discharge by the spark plug 25).

At step 230, the difference AT(N) between the time (T(N)) of the current input (Nth input) of the reference ignition signal (A) and the time (T(N−1)) of the previous input (N−1th input) of the reference ignition signal (A) is calculated. Namely, the time between the successive reference ignition signals (A) is determined.

At step 240, the engine speed (rpm) is determined by "2 rotations×60 sec/AT(N)" (in the case of 1 ignition/2 rotations in the four-cycle engine).

At step 250, the stored engine speed/knock window variable S is counted up.

At step 260, the engine speed determined at step 240, which corresponds to the stored engine speed/knock window variable S, is stored (memorized) as an RPN(S).

At step 270, the knock detection window KNW(S) is calculated. Herein, the knock detection window KNW(S) corresponding to the stored engine speed/knock window variable S is calculated by a known calculation method. The calculated value is stored.

At step 280, it is judged whether or not the stored engine speed/knock window variable S exceeds 2. When the judgment result is affirmative, the process goes to step 290. When the judgment result is negative, the process goes back to step 180.

At step 290, the after-mentioned knocking detection process is performed to detect a knocking state of the engine (i.e. judge the occurrence or non-occurrence of knocking in the engine).

At step 300, the deviation ΔRPN of the engine speed (referred to as "engine speed deviation"), which indicates a magnitude of change in engine speed, is calculated by "RPNS (S)/RPNS(S−1)", i.e., by dividing the current (Sth) engine speed value RPNS(S) by the previous (S−1th) engine speed value RPNS(S−1).

At step 310, it is judged whether or not the engine speed deviation ΔRPN is smaller than a predetermined judgment value RPNs. When the judgment result is affirmative, the process goes to step 320. When the judgment result is negative, the process goes to step 330.

At step 330, the reference ignition timing TIGIN itself is set as the corrected ignition timing TIG as the engine speed deviation ΔRPN is so great that it is not adequate to advance the ignition timing. The process then goes back to step 180.

At step 320, it is judged whether or not the knock detection flag KNS is set to 1 through the after-mentioned knocking detection process for judgement of the occurrence or non-occurrence of engine knocking. When the judgment result is affirmative judgment, the process goes to step 340. When the judgment result is negative, the process goes to step 330.

At step 330, the reference ignition timing TIGIN itself is set as the corrected ignition timing TIG in the non-occurrence of engine knocking. The process then goes back to step 180.

In the occurrence of engine knocking, on the other hand, it is judged at step 340 whether the ignition timing (corrected ignition timing TIG) has reached a maximum retard value TIGM. When the judgment result is affirmative, the process goes to step 360. When the judgment result is negative, the process goes to step 350.

As mentioned above, the maximum retard value TIGM refers to an ignition timing retarded by the greatest retard amount (maximum retard amount) (e.g. +5°) relative to the maximum advance value.

As the corrected ignition timing TIG has reached the maximum retard value TIGM, the maximum retard value TIGM is set as the corrected ignition timing TIG at step 360. The process then goes back to step 180.

At step 350, on the other hand, the ignition timing is retarded by a predetermined amount ΔTIG (e.g. +1°) as the corrected ignition timing TIG has not reached the maximum retard value TIGM so that there is room to further retard the ignition timing. In the present first embodiment, the predetermined amount (retard correction value) ΔTIG is added to the corrected ignition timing value TIG. The addition result is determined as the current corrected ignition timing value TIG. The process then goes back to step 180.

By the above operation process, the ignition timing is gradually stepwisely retarded upon every detection of the engine knocking and is advanced back to the maximum advance value (i.e. reference ignition timing TIGIN) in one stroke upon detection of no engine knocking as shown in FIG. 5.

<Knocking Detection Process>

This process is performed at a predetermined time interval to detect the knocking state of the engine on the basis of the knocking signal.

Figure 8:
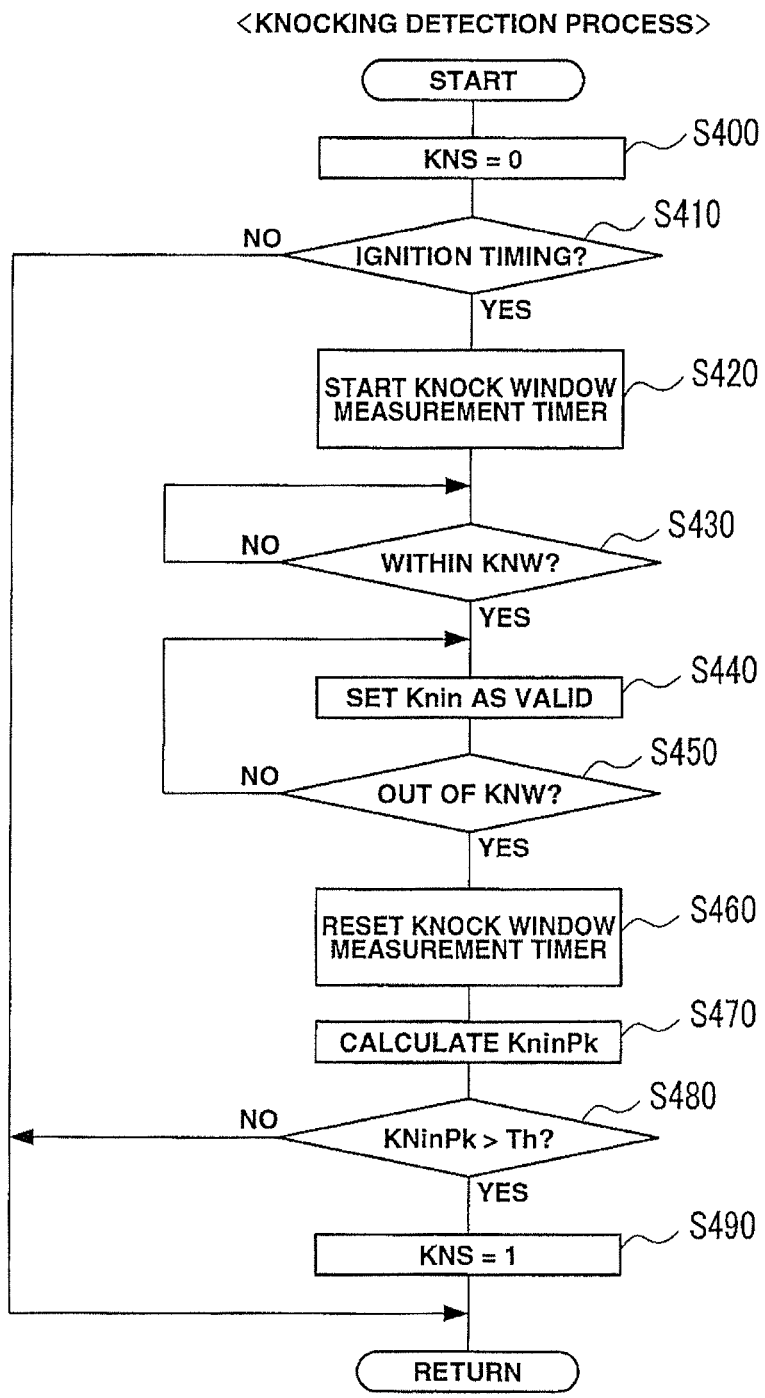
FIG. 8 is a flowchart for a knocking detection process of the ignition timing adjustment unit according to the first embodiment of the present invention.

As shown in the flowchart of FIG. 8, the knock detection flag KNS is cleared (set to 0) at step 400.

At step 410, it is judged whether or not the ignition timing comes (whether or not it is the timing to switch the ignition signal from the high level to the low level). When the judgment result is affirmative, the process goes to step 420. If the judgment result is negative, the process exits.

At step 420, the knock detection window measurement timer is started.

At step 430, it is judged based on the count value of the knock detection window measurement timer whether or not the current time is within a period corresponding to the knock detection window KNW as determined at step S250 (that is, whether or not the current time is within the knock detection window KNW). When the judgment result is affirmative, the process goes to step 440. When the judgment result is negative, the process goes back to step 430 and undergoes the same operation.

At step 440, the knocking signal Knin outputted from the knocking detection unit 41 is set as valid.

At step 450, it is judged based on the count value of the knock detection window measurement timer whether the period corresponding to the knock detection window KNW has elapsed (that is, whether the knock detection window KNW has elapsed). When the judgment result is affirmative, the process goes to step 460. When the judgment result is negative, the process goes back to step 440 and undergoes the same operation.

At step 460, the knock detection window measurement timer is reset.

At step 470, the peak value Kninpk of the knocking signal Knin is calculated.

At step 480, it is judged whether the peak value Kninpk of the knocking signal Knin exceeds a predetermined judgment value, which is set as a criterion for judgment of the occurrence or non-occurrence of engine knocking, (that is, whether or not engine knocking is occurring). When the judgment result is affirmative, the process goes to step 490. When the judgment result is negative, the process exits.

At step 490, the knock detection flag KNS is set (to 1) to indicate the occurrence of knocking in the engine. The process then exits.

f) The effects of the present first embodiment will be explained below.

As described above, the knocking detection unit 41 and the ignition timing adjustment unit 43 are electrically connected to each other through the connection cable 45 and integrated together in the ignition timing control device 31 in the present first embodiment. Further, the ignition timing adjustment unit 43 receives not only the input of the knocking signal from the knocking detection unit 41 but also the input of the reference ignition signal (A) from the internal combustion engine control unit 37.

In this configuration, the ignition timing adjustment unit 43 is adapted to correct the ignition timing to a proper ignition timing in the retard region (including the maximum advance value) with respect to the maximum advance value on the basis of the knocking signal inputted from the knocking detection unit 41 and the reference ignition signal (A) inputted from the internal combustion engine control unit 37

In other words, the timing of the corrected ignition signal (B) outputted from the ignition timing adjustment unit 43 to the ignitor 33 relative to the reference ignition timing given from the internal combustion engine control unit 37 can be adjusted promptly (without one cycle delay) by retarding the ignition timing in the retard region with respect to the maximum advance value upon detection of the engine knocking in the present first embodiment. This enables quick control of the output signal from the ignition timing adjustment unit 43.

It is therefore possible to obtain the significant effect for improvement of vehicle performance such as drivability and ignition performance.

In addition, the ignition timing is gradually stepwisely retarded upon detection of the engine knocking and is advanced back to the maximum advance value in one stroke upon detection of no engine knocking in the present first embodiment.

It is thus possible to properly suppress the engine knocking, while preventing a sudden decrease in engine torque, by gradually retarding the ignition timing upon detection of the engine knocking. It is also possible to promptly increase the engine torque by setting the ignition timing to the maximum advance value in one stroke upon detection of no engine knocking.

Second Embodiment

Next, the second embodiment will be described below. An explanation of the same parts and portions of the second embodiment as those of the first embodiment will be omitted herefrom.

The second embodiment is the same in hardware configuration as, but different in control content from the first embodiment. The control content of the second embodiment will be explained below. In the following explanation, the same hardware components of the second embodiment as those of the first embodiment are designated by the same reference numerals.

Figure 9:
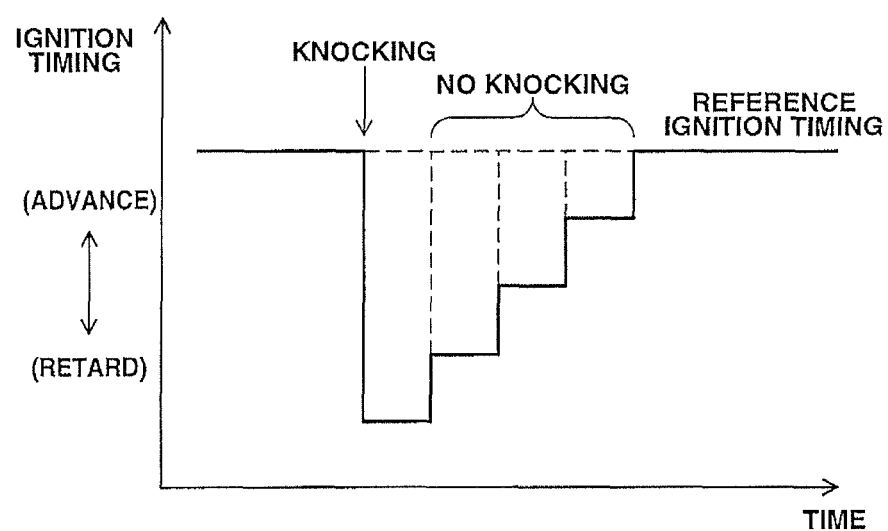
FIG. 9 is a graph showing the relationship of engine knocking and ignition timing control performed by an ignition timing control device according to a second embodiment of the present invention.

In the second embodiment, the ignition timing (corrected ignition timing) is retarded from the reference ignition timing, that is, the maximum advance value to the maximum retard value in one stroke upon detection of the engine knocking, and then, is gradually stepwisely advanced upon detection of no engine knocking at every predetermined time interval as shown in FIG. 9.

The control operations of the second embodiment will be explained below.

Figure 10:
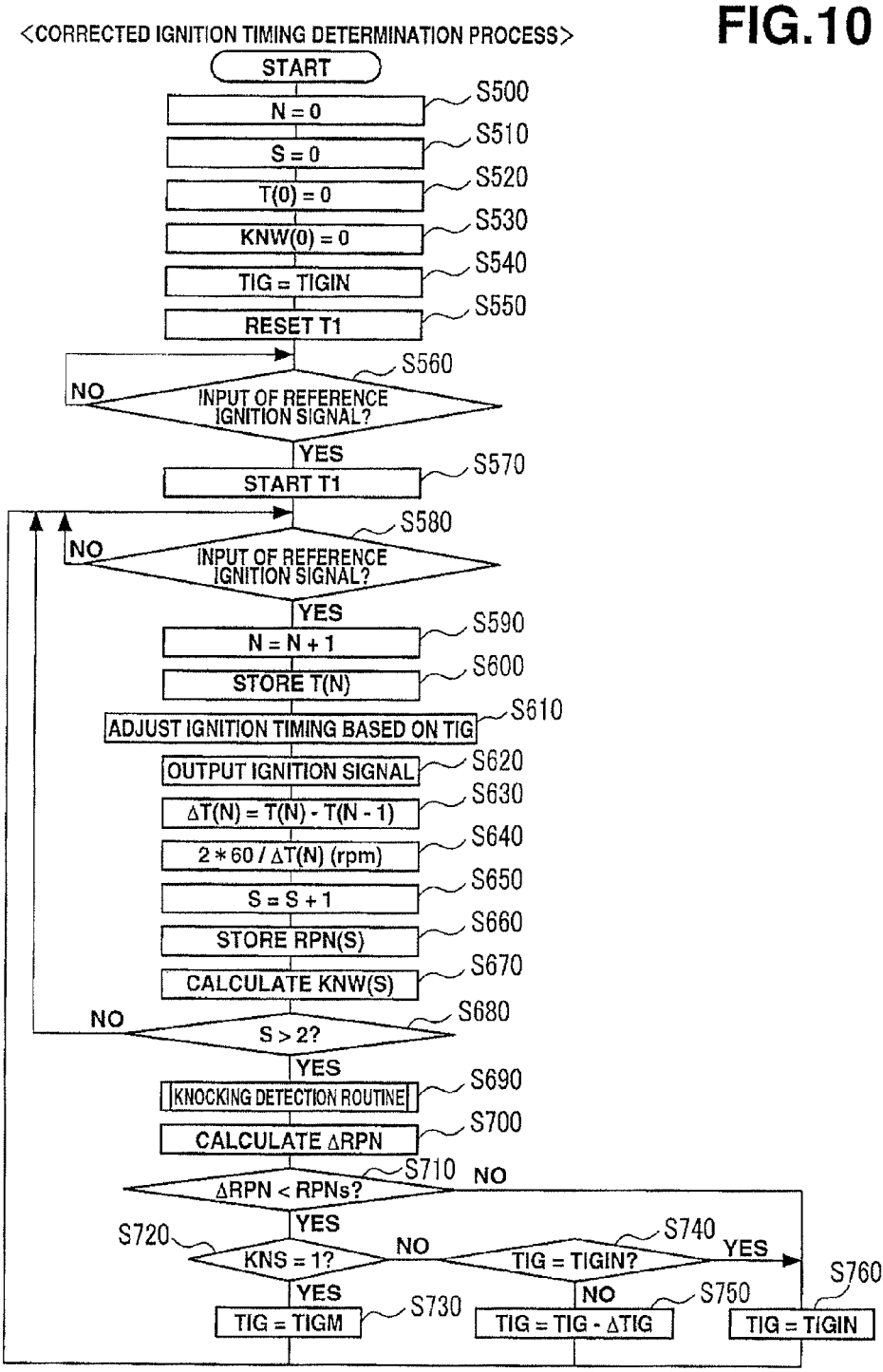
FIG. 10 is a flowchart for a corrected ignition timing determination process of an ignition timing adjustment unit of the ignition timing control device according to the second embodiment of the present invention

As shown in the flowchart of FIG. 10, the same operations of steps 500 to 700 in the second embodiment are the same as those of steps 100 to 300 in the first embodiment. An explanation of these operations will be thus omitted herefrom.

At step 710, it is judged whether or not the engine speed deviation ΔRPN is smaller than a predetermined judgment value RPNs. When the judgment result is affirmative, the process goes to step 720. When the judgment result is negative, the process goes to step 760.

At step 760, the reference ignition timing TIGIN itself is set as the corrected ignition timing TIG as the engine speed deviation ΔRPN is so great that it is not adequate to advance the ignition timing. The process then goes back to step 580.

At step 720, it is judged whether or not the knock detection flag KNS is set to 1 through the above-mentioned knocking detection process for judgement of the occurrence or non-occurrence of engine knocking. When the judgment result is affirmative judgment, the process goes to step 730. When the judgment result is negative, the process goes to step 740.

At step 730, the ignition timing (corrected ignition timing TIG) is set to the maximum retard value TIGM in the occurrence of engine knocking. The process then goes back to step 580.

In the non-occurrence of engine knocking, on the other hand, it is judged at step 740 whether the ignition timing (corrected ignition timing TIG) has reaches the reference ignition timing TIGIN, that is, the maximum advance value. When the judgment result is affirmative, the process goes to step 760. When the judgment result is negative, the process goes to step 750.

At step 760, the reference ignition timing TIGIN is set as the corrected ignition timing TIG as the corrected ignition timing TIG has reached the reference ignition timing TIGIN. The process then goes back to step 580.

At step 750, on the other hand, the ignition timing is advanced by a predetermined amount ΔTIG as the corrected ignition timing TIG has not reached the reference ignition timing TIGIN so that there is room to further advance the ignition timing. In the second embodiment, the predetermined amount (advance correction value) ΔTIG is subtracted from the corrected ignition timing value TIG. The addition result is determined as the current corrected ignition timing value TIG. The process then goes back to step 580.

It is therefore possible in the second embodiment to obtain the same effects (such as quick setting of the corrected ignition timing) by the above control operations as those in the first embodiment.

Furthermore, the ignition timing is retarded to the maximum retard value in one stroke upon detection of the engine knocking and is gradually stepwisely advanced upon detection of the engine knocking as shown in FIG. 9 in the second embodiment.

It is thus possible to protect the engine from damage due to the engine knocking and ensure high safety by retarding the ignition timing to the maximum retard value in one stroke upon detection of the engine knocking. It is also advantageously possible to suppress the engine knocking by gradually advancing the ignition timing upon detection of no engine knocking.

The present invention is not limited to the above embodiments. Various changes and modifications of the above embodiments are possible within the scope of the present invention.

Figure 11:
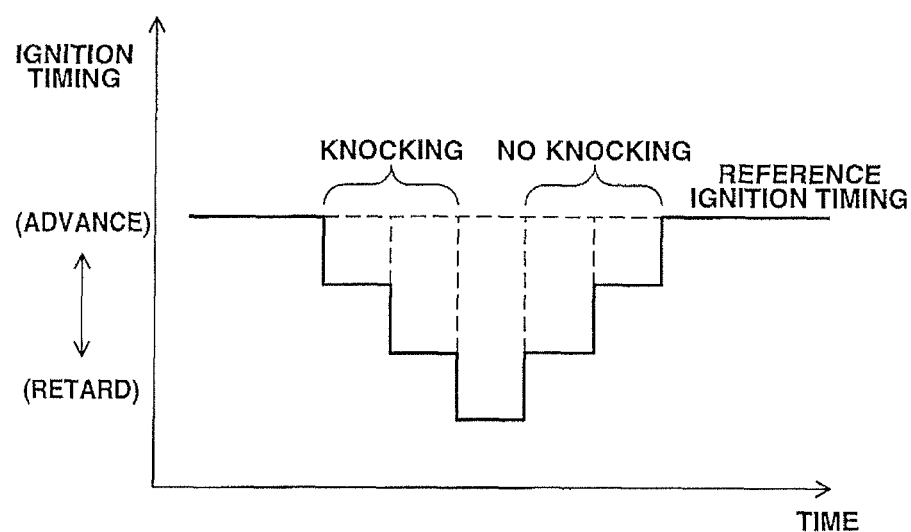
FIG. 11 is a graph showing the relationship of engine knocking and ignition timing control performed by an ignition timing control device according to another embodiment of the present invention.
Figure 12A:
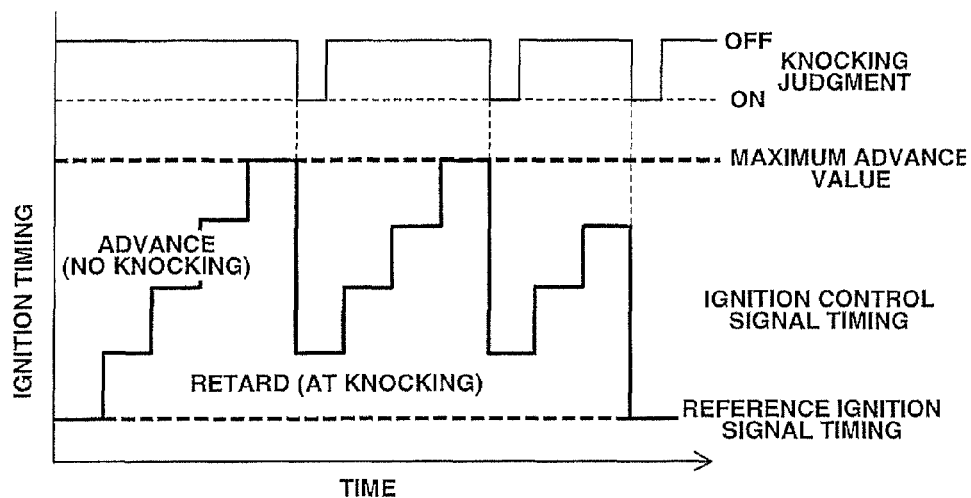
FIG. 12A is a graph showing the relationship of engine knocking and ignition timing control in a conventional technique.
Figure 12B:
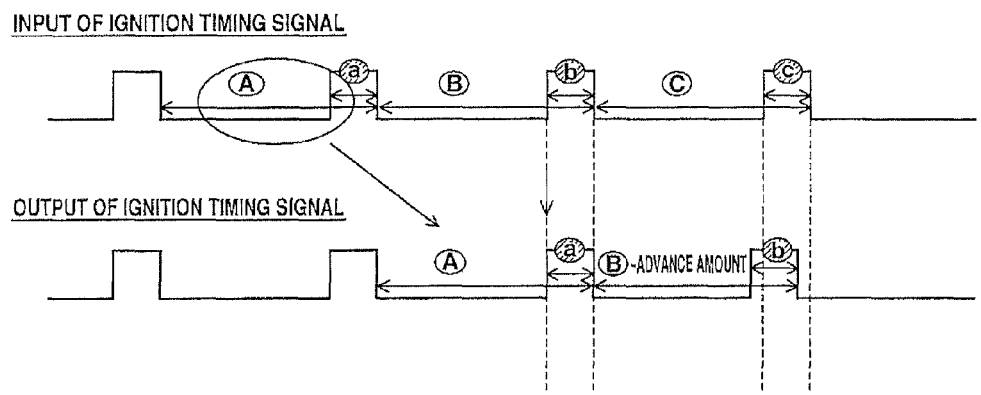
FIG. 12B is a graph showing the relationship of ignition timing signal input and output in a conventional technique.

(1) For example, it is feasible to perform control operations as shown in FIG. 11 by combination of the above first and second embodiments.

In this modified example, the control operations are performed so as to gradually retard the ignition timing upon detection of the engine knocking as in the case of the first embodiment, and then, gradually advance the ignition timing upon detection of no engine knocking as in the case of the second embodiment. The ignition timing can be stepwisely retarded by addition of a predetermined retard amount (e.g. ΔTIG) to the previously corrected ignition timing value at every detection judgement of the engine knocking; and the ignition timing can be stepwisely advanced by subtraction of a predetermined advance amount (e.g. ΔTIG) from the previously corrected ignition timing value at every detection judgement of no engine knocking.

Even by the control operations of FIG. 11, the ignition timing is corrected in the retard region (including the maximum advance value) with respect to the maximum advance value.

It is thus possible to, upon detection of the engine knocking, properly suppress the engine knocking while preventing a sudden decrease in engine torque. It is also possible to, upon detection of no engine knocking, appropriately increase the engine torque while effectively suppressing the engine knocking.

(2) The knocking detection unit is not limited to the non-resonant type knocking sensor. A resonant type knocking sensor can alternatively be used. There is no particular limitation on the kind of the knocking detection unit as long as it is capable of detecting the engine knocking.

(3) Although the engine knocking is detected from the peak of the knocking signal in the above embodiments, there is also no particular limitation on the method for detection of the engine knocking. It is alternatively feasible to detect the engine knocking by any other known method e.g. by means of FFT value or integration value of the knocking signal (4) The present invention is also applicable to a two-cycle engine.

(5) As the external electronic control unit of the present invention, there can be used any equipment that performs various control operations by a microcomputer. The internal combustion engine control device, which is provided separately from the ignition timing control device (through a detachable lead line etc.) for operation control of the internal combustion engine, is one example of the external electronic control unit.

DESCRIPTION OF REFERENCE NUMERALS

1: Internal combustion engine
3: Engine body
25: Spark plug
31: Ignition timing control device
33: Ignitor
35: Ignition coil
37: Internal combustion engine control unit
41: Knocking detection unit
43: Ignition timing adjustment unit

The invention claimed is:

1. An ignition timing control device for an internal combustion engine, comprising:
   a knocking detection unit that detects a knocking state of the internal combustion engine; and
   an ignition timing adjustment unit that adjusts an ignition timing of the internal combustion engine based on a knocking signal outputted from the knocking detection unit and indicating the knocking state of the internal combustion engine and an external ignition signal outputted from an external electronic control unit and indicating a reference ignition timing of the internal combustion engine,
   wherein the ignition timing adjusted by the ignition timing adjustment unit is controlled in a retard region with respect to the reference ignition timing indicated by the external ignition signal.

2. The ignition timing control device according to claim 1, wherein the ignition timing adjustment unit retards the ignition timing when detecting the occurrence of knocking in the engine based on the knocking signal.

3. The ignition timing control device according to claim 2, wherein the ignition timing adjustment unit adds a predetermined retard amount to a previously set value of the ignition timing when detecting the occurrence of knocking in the engine based on the knocking signal.

4. The ignition timing control device according to claim 2, wherein the ignition timing adjustment unit retards the ignition timing by a maximum retard amount when detecting the occurrence of knocking in the engine based on the knocking signal.

5. The ignition timing control device according to claim 1, wherein the ignition timing adjustment unit advances the ignition timing within the retard region when detecting the occurrence of no knocking in the engine based on the knocking signal.

6. The ignition timing control device according to claim 5, wherein the ignition timing adjustment unit adds a predetermined advance amount to a previously set value of the ignition timing when detecting the occurrence of no knocking in the engine based on the knocking signal.

7. The ignition timing control device according to claim 5, wherein the ignition timing adjustment unit adjusts the ignition timing to the reference ignition timing when detecting the occurrence of no knocking in the engine based on the knocking signal.

8. The ignition timing control device according to claim 1, wherein the reference ignition timing is set corresponding to a maximum advance value.

9. An ignition timing control system, comprising:
   the ignition timing control device according to claim 1; and
   the external electronic control unit.

* * * * *